(12) United States Patent
McElligott

(10) Patent No.: US 8,321,512 B2
(45) Date of Patent: Nov. 27, 2012

(54) METHOD AND SOFTWARE PRODUCT FOR IDENTIFYING UNSOLICITED EMAILS

(75) Inventor: Adrian McElligott, Durack (AU)

(73) Assignee: Geobytes, Inc., Griffin, Queensland (AU)

( * ) Notice: Subject to any disclaimer, the term of this patent is extended or adjusted under 35 U.S.C. 154(b) by 1530 days.

(21) Appl. No.: 10/922,010

(22) Filed: Aug. 19, 2004

(65) Prior Publication Data

US 2005/0044160 A1    Feb. 24, 2005

Related U.S. Application Data

(60) Provisional application No. 60/497,210, filed on Aug. 22, 2003.

(51) Int. Cl.
G06F 15/16        (2006.01)
(52) U.S. Cl. .................................... 709/206; 709/207
(58) Field of Classification Search .................. 709/204, 709/205, 206, 207
See application file for complete search history.

(56) References Cited

U.S. PATENT DOCUMENTS

| | | | |
|---|---|---|---|
| 5,050,121 A * | 9/1991 | Vaughan | 715/201 |
| 5,619,648 A | 4/1997 | Canale et al. | |
| 5,930,479 A * | 7/1999 | Hall | 709/238 |
| 6,023,723 A | 2/2000 | McCormick et al. | |
| 6,112,227 A * | 8/2000 | Heiner | 709/203 |
| 6,167,435 A * | 12/2000 | Druckenmiller et al. | 709/206 |
| 6,199,102 B1 | 3/2001 | Cobb | |
| 6,718,321 B2 * | 4/2004 | Birrell et al. | 707/2 |
| 6,901,579 B1 * | 5/2005 | Suguta | 717/108 |
| 6,973,481 B2 * | 12/2005 | MacIntosh et al. | 709/206 |
| 7,007,068 B2 * | 2/2006 | Morkel | 709/206 |
| 7,010,565 B2 * | 3/2006 | Sampson | 709/202 |
| 7,016,700 B2 * | 3/2006 | Takahashi et al. | 709/206 |
| 7,058,684 B1 * | 6/2006 | Ueda | 709/206 |
| 7,263,607 B2 * | 8/2007 | Ingerman et al. | 713/150 |
| 7,269,731 B2 * | 9/2007 | Oakeson et al. | 713/172 |
| 7,406,501 B2 * | 7/2008 | Szeto et al. | 709/206 |

(Continued)

FOREIGN PATENT DOCUMENTS

WO    0157696    8/2001

OTHER PUBLICATIONS

J. Klensin; Simple Mail Transfer Protocol; Apr. 2001; AT&T Laboratories; RFC 2821; Sections 2.4 and 3.3.*

Primary Examiner — John Follansbee
Assistant Examiner — Madhu Woolcock
(74) Attorney, Agent, or Firm — Boyle Fredrickson, S.C.

(57) ABSTRACT

A method and software product for detecting unsolicited emails, e.g. spam, involves altering the case of at least some symbols comprising an email user's email address according to a predetermined criteria prior to transmitting an email message. The altered case sequence of the email user's address is stored in a database. Subsequently, as email's are received in the email user's mailbox their intended recipient addresses are processed to determine if they include symbols whose case sequence, i.e. uppercase and lowercase, matches one of the sequences that was previously stored. If no match is found then the incoming email is treated as potentially constituting spam and is handled as such. Embodiments of the invention take advantage of a property of most Internet post office email servers being that they are generally case insensitive in respect of the symbols that make up an email address.

30 Claims, 8 Drawing Sheets

U.S. PATENT DOCUMENTS

| | | |
|---|---|---|
| 7,539,681 B2 * | 5/2009 | Norton et al. .......................... 1/1 |
| 2002/0026528 A1 * | 2/2002 | Lo ................................ 709/245 |
| 2002/0188690 A1 * | 12/2002 | Lee ............................... 709/206 |
| 2003/0009594 A1 | 1/2003 | McElligott |
| 2003/0065941 A1 * | 4/2003 | Ballard et al. ................. 713/201 |
| 2003/0158888 A1 * | 8/2003 | Bjorklund et al. ............ 709/201 |
| 2003/0208634 A1 | 11/2003 | McElligott |
| 2003/0225850 A1 * | 12/2003 | Teague .......................... 709/207 |
| 2004/0068543 A1 * | 4/2004 | Seifert .......................... 709/206 |
| 2004/0093566 A1 | 5/2004 | McElligott |
| 2004/0205173 A1 * | 10/2004 | Hall ............................. 709/223 |
| 2006/0168010 A1 * | 7/2006 | Vill et al. ..................... 709/206 |
| 2007/0115998 A1 | 5/2007 | McElligott |

* cited by examiner

METHOD AND SOFTWARE PRODUCT FOR IDENTIFYING UNSOLICITED EMAILS

CROSS REFERENCE TO RELATED APPLICATION

This application claims the benefit under 35 U.S.C. §119 (e) of U.S. Provisional Application Ser. No. 60/497,210, filed Aug. 22, 2003, the entirety of which is expressly incorporated by reference herein.

FIELD OF THE INVENTION

The present invention relates to a method and software product for identifying unsolicited electronic mail messages.

BACKGROUND TO THE INVENTION

Since the advent of the Internet, the popularity of electronic mail or "email" has grown to the point where it is now widely used for both personal and business communication. It is widely recognized that the viability of email is threatened by a problem in the form of the proliferation of unsolicited emails, often mass generated by automated means. Mass emails of this type are known as "Spam" and the orchestrators of Spam as "Spammers".

The problem has developed to a point where businesses are reluctant to publish their email addresses on their web sites, individuals are reluctant to include their email address in News Group postings, and some people are finding it necessary to periodically abandon their email address and to acquire a new one.

Electronic mail has become a significant means of communication between businesses and individuals alike, and the disruption being inflicted by unsolicited email is imposing a significant cost in both financial and social terms.

Many promising solutions have been applied to the problem. One approach is to install a filtering application upon a user's workstation that searches incoming email messages to determine if they contain any of a blacklist of text strings. If an email does contain a blacklisted text string then that email is diverted from the user's standard mailbox and either deleted or placed in a second mailbox. An example of such a filtering system is described in U.S. Pat. No. 6,023,723 issued Feb. 8, 2000 to McCormick, et al. An earlier filtering system is described in U.S. Pat. No. 5,619,648 to Canale, et al. issued Apr. 8, 1997.

Unfortunately, a number of problems are associated with anti-Spam filtering techniques. For example, anti-Spam filters specifically tend to block messages that contain certain words that may be associated with products that are typically peddled by Spammers. Such words may refer to pornography, financial services and certain pharmaceutical products for example. As a result the filters inadvertently impose a form of censorship on their users by preventing them from participating in email discussions on certain subjects.

Furthermore, anti-Spam filtering systems walk a fine line between incorrectly blocking legitimate messages and failing to block unsolicited, unwanted messages. Most filtering systems allow the user to adjust the filter to err on one side or the other. Nevertheless it remains the case that some legitimate messages will be treated as Spam and some Spam emails treated as legitimate messages and forwarded to the user. Since a percentage of legitimate messages will be incorrectly filtered out as Spam, a user will need to review all of the blocked messages if he or she wishes to be sure that no legitimate messages have been blocked. Unfortunately such a review exposes the user to all of the Spam messages which is the very problem that the filtering software is employed to overcome.

Apart from anti-Spam filters, another approach to reducing Spam is the so-called sender challenge-response verification system. Examples of such systems are disclosed in U.S. Pat. No. 6,112,227 to Heiner issued Aug. 29, 2000 and in U.S. Pat. No. 6,199,102 to Cobb issue Mar. 6, 2001.

The challenge-response approach to addressing the problem of Spam involves checking whether or not the email's sender's address is on a list, i.e a."white list" of known legitimate correspondents. If the email's sender's address is not on the white list then a challenge is sent to the sender requesting a reply. If the sender does not respond to the challenge then it is assumed that the sender was an automated Spamming application or "Spambot" and the email is not passed on to its intended recipient. Since most Spam is generated by automated Spamming applications, the challenge-response system cuts down on a large portion of unwanted email.

However, one of the disadvantages of using a traditional challenge-response system arises when the user wants to subscribe to an e-zine. It is common for e-zine providers to use automated subscription processes that are not capable of responding to the sender verification system's request for verification, making it necessary for the user to manually white list the e-zine provider. Further, in many cases whitelisting the e-zine provider's email address is not possible as many e-zine providers frequently change the sender's address that the sender verification system uses to verify the sender.

Another problem with challenge-response systems is that a user cannot send themselves an email. This is because to do so the user would have to white list their own email address. Doing so would mean that the system could be easily circumvented by Spammers as all that they need do is forge the sender's address to appear that the user is sending themselves an email. In general, white lists, whether used with challenge response or filter systems, may be rendered ineffective by Spammers that collect and use lists of associated email addresses in order to make their Spam appear as if it is coming from a person that is known to the recipient.

Another inhibitor to widespread acceptance of challenge-response anti-Spam systems is the need for the sender to verify that they are human and a reluctance on the part of users to impose this burden on to the legitimate users that send them email.

It is an object of the present invention to provide a method that addresses the problem of unsolicited emails and which is an improvement upon the prior-art approaches discussed above.

SUMMARY OF THE INVENTION

According to a first aspect of the present invention there is provided a method for processing email messages, said messages having an intended recipient address identifying a user's mailbox, the method including, for each of said messages, the step of:

checking by means of a computational device that a number of the symbols comprising the intended recipient address are uppercase or lowercase in accordance with a predetermined criteria.

The step of checking may include determining if a case sequence of at least a portion of the intended recipient address corresponds to a previously stored case sequence.

In one embodiment the step of checking further includes determining if a domain name portion of a sender address corresponds to a previously stored domain name.

The method may include determining if a domain name portion of the sender address is a case insensitive match with a previously stored domain name.

Preferably the method further includes:

applying case alterations to symbols comprising a sender's email address prior to transmission of emails including the email address; and storing information indicating the cases of said symbols for subsequent reference during said checking step.

Preferably the method further includes selecting case altered sender's email addresses on the basis that they exceed a predetermined readability threshold.

The information indicating the cases of said symbols may comprise a copy of sender's email address subsequent to applying the case alterations.

In one embodiment the information indicating the cases of said symbols comprises a binary number.

The method may include a step of storing strings of symbols from each email message for subsequent reference during said checking step, the strings being located in portions of the messages that are used during the generation of reply messages.

Preferably the strings of symbols comprise the domain names of the addresses to which the emails are sent.

Preferably the method further includes the step of deleting the stored information indicating the cases of said symbols after a predetermined time.

The step of checking may be performed by software running on a computer used to read mail from the user's mailbox.

Alternatively the step of checking may be performed by software running on an Internet email server in communication with a computer used to read mail from the user's mailbox.

In one embodiment the step of applying case alterations to symbols comprising a sender's email address includes providing case altered email addresses for inclusion in web pages.

According to a further aspect of the present invention there is provided a computer readable software product for execution by one or more electronic processors said software product including:

instructions to check that a number of the symbols comprising an intended recipient address of an email message are uppercase or lowercase in accordance with a predetermined criteria.

The software product may also include instructions to determine if a case sequence of at least a portion of the intended recipient address corresponds to a previously stored case sequence.

In one embodiment the software product includes instructions to determine if a domain name portion of the sender's address corresponds to a previously stored domain name.

The instructions to determine if a domain name portion of the sender's address corresponds to a previously stored domain name may include instructions to determine if a domain name portion of the sender's address is a case insensitive match with a previously stored domain name.

Preferably the software product includes instructions to apply case alterations to symbols comprising a sender's email address prior to transmission of emails including the email address; and storing information indicating the cases of said symbols for subsequent reference during said checking step.

In one embodiment the software product includes instructions to select case altered sender's email addresses on the basis that they exceed a predetermined readability index.

The software product may include instructions to indicate the cases of said symbols in the form of a binary number.

In one embodiment the software product includes instructions to store strings of symbols from each email message for subsequent reference during execution of said instructions to check, said strings being located in portions of the messages that are typically used during the generation of reply messages.

Preferably the strings of symbols comprise the domain names of the addresses to which the emails are sent.

The software product may include instructions to delete the stored information indicating the cases of said symbols after a predetermined time.

According to a further aspect of the present invention there is provided a method of screening email comprising:

providing a computer equipped with or linked to an email program of a sender;

parsing a sender's email address and determining a credential therefrom;

retaining the credential; and using the credential to ascertain whether a future email addressed to the sender is unsolicited.

Preferably the credential comprises a code based upon a case sequence of the sender's email address.

The code may comprise a binary number.

In one embodiment the credential is retained by a second computer that is remotely located.

The credential may be generated or otherwise provided by the second computer that is remotely located.

Preferably the credential is used by a third computer that is remotely located to ascertain whether a second future email is unsolicited.

The future email will typically be blocked if it is determined to be unsolicited.

Alternatively the future email may be further processed to determine whether it is Spam if the future email is determined to be unsolicited.

The credential may comprise a case sequence that is retained in a database along with a date of creation of the case sequence and an expiration date of the case sequence.

Preferably details of the addressee are also stored in the database with each corresponding case sequence.

Further preferred features of the present invention will be described in the following detailed description which will refer to a number of figures as follows.

DETAILED DESCRIPTION OF EXEMPLARY EMBODIMENTS

Internet email servers support numerous virtual mailboxes each addressable by an email address having a domain portion and a local portion.

Typically email servers treat the domain portion of an email address in a case insensitive manner. The local portion, that is the portion of the email address to the left of the "@" symbol is implementation specific so that a particular server may or may not be case insensitive to the local portion. However, the defacto procedure for managing email addresses is for the mail server to fall back to case-insensitive local portion matching if a literal, i.e. case-sensitive, match cannot be found. Consequently, in general the email address somemailbox@someisp.com is treated in the same manner as SOMEMAILBOX@SOMEISP.COM and in the same manner as SomeMailboX@somEisp.Com or any other case variant.

The number of combinations of upper and lower case characters that can be used to represent a given email address containing n alphabetical characters is $2^n$. It follows that an email address having 18 alphabetical characters, for example, may be case coded with any one of over 260,000 case-sensitive sequences.

Figure 1:
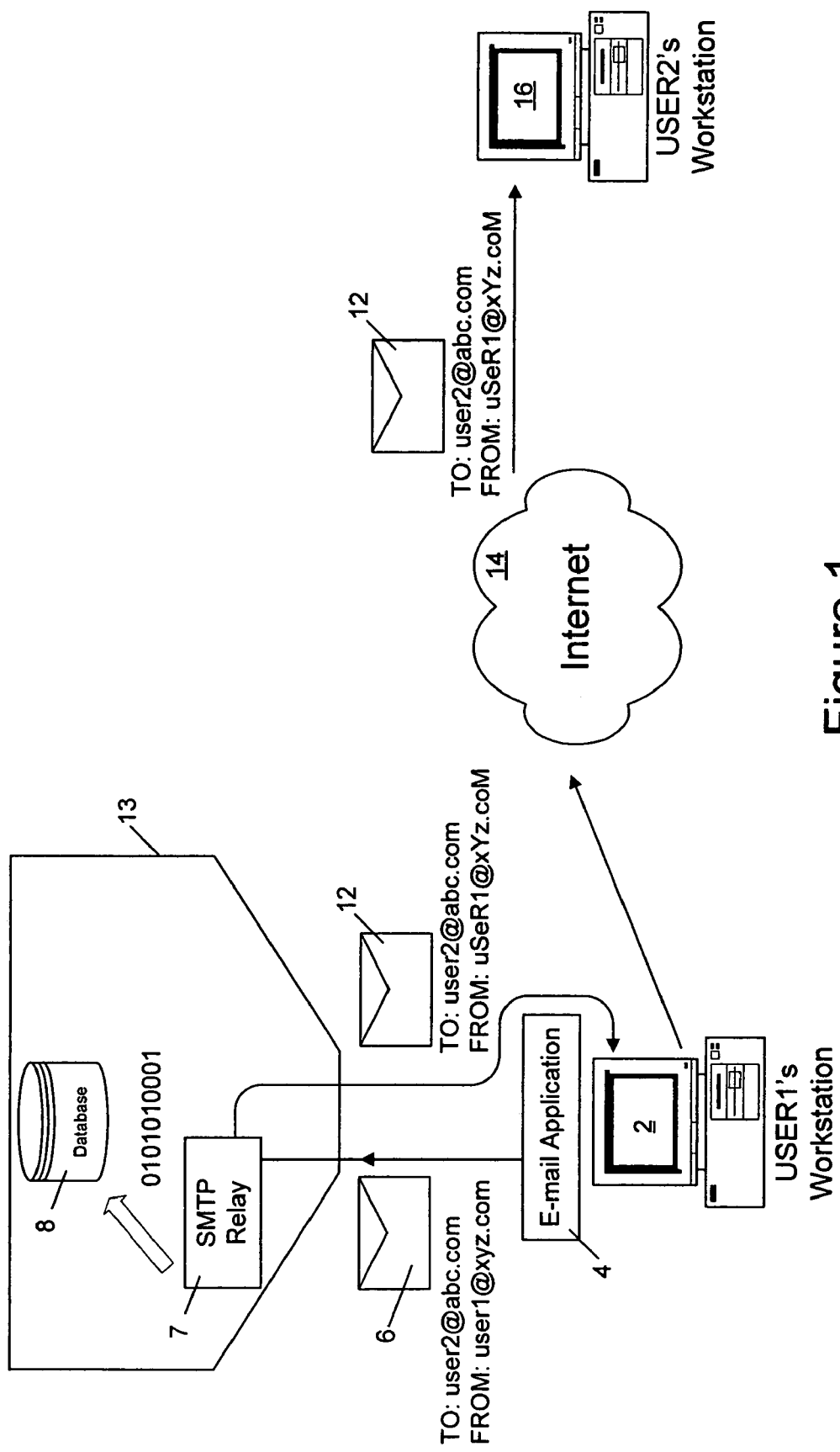
FIG. 1 is a diagram depicting the generation of an email according to a first embodiment of the invention.

A preferred embodiment of the present invention will now be explained with reference to FIGS. 1, 2 and 3. Referring now to FIG. 1, USER1's workstation 2 generates an email message 6 by means of any standard email application such as Microsoft Outlook 4. Email message 6 includes a TO field containing the string "user2@abc.com" being the address of an intended recipient's mailbox. Email message 6 also includes one or more instances of USER1's email address, one of which appears in the "FROM" field as indicated in FIG. 1. It may also appear in the "REPLY-TO" or "RETURN-PATH" fields of the message. In the present example the intended recipient is an individual named "USER2" who makes use of workstation 16 to access his/her email mailbox. After generation by application 4, the email message is parsed by a mini post-office or email proxy application 13 also running on workstation 2. Application 13 comprises a software product that includes various instructions for performing a method according to the invention described herein.

An SMTP Relay proxy module 7 of application 13 processes instances of USER1's email address in the headers of message 6 and replaces them with a particular case coded variation of the sender's email address which in the present example is "uSeR1@xYz.coM" to form a modified message 12. The binary number representing the case sequence of "uSeR1@xYz.coM" is 0101010001 and this number is stored in case sequence database 8. Further information, such as the addressee's details, the date on which the case-coded sender address was created, and an expiry date may also be stored in database 8. The case sequences may be generated randomly or alternatively they could be produced by simply incrementing, or otherwise manipulating, the corresponding representative binary number each time a new email is produced.

It may be observed that some case sequences are more "friendly", e.g. easier to read, than others. For example the case sequenced email address RobERT@SOMEisp.com is easier to read than "rObERt@sOmEisP.coM. In one embodiment email proxy application 13 contains instructions to implement a procedure to case sequence email addresses and instructions that implement a method to quantify the readability of each case sequenced email address. For example, all case sequences for a given email address may be generated and graded for readability. Those that exceed a predefined quantifier threshold are retained.

The readability quantifier procedure operates as follows. Initially each case sequence is read as a corresponding binary sequence, e.g. 111010111001100000 where "1" corresponds to an uppercase symbol and "0" corresponds to a lowercase symbol.

The binary number is then read from left to right counting the number of characters between each transition. In the following example a space has been placed at each transition:
111 0 1 0 111 00 11 00000
3 1 1 1 3 2 2 5
One (1) is then subtracted from each 'run' total.
eg. 2 0 0 0 2 1 1 4
The sequence of numbers is then summed.
e.g. 2+0+0+0+2+1+1+4=10
The resulting number is then divided by the length in bits, less 1 to produce a readability index.
10/(18−1)=0.588
In the present example a corresponding case sequence might be KAEIEnE@GEbyTEs.com The readability quantifier procedure produces a number between 0 and 1 with higher numbers indicating more readable case sequences.

Some example case sequenced email addresses and their corresponding binary case code and readability index are as follows:

| | | |
|---|---|---|
| ADrIAN@GeObYtEs.com | | |
| 110111 10101010 000 | 1 + 2 + 2 = 5 | 5/16 = 0.3125 |
| adrIAN@GEObytes.com | | |
| 000111 11100000 000 | 2 + 5 + 7 = 14 | 14/16 = 0.875 |
| ADrian@geOBYTEs.com | | |
| 110000 00111110 000 | 1 + 5 + 4 + 3 = 13 | 13/16 = 0.8125 |
| ADRian@GEOBYtes.Com | | |
| 111000 11111000 100 | 2 + 2 + 4 + 2 + 1 = 11 | 11/16 = 0.6875 |
| AdRIaN@GeOBYTes.Com | | |
| 101101 10111100 100 | 1 + 1 + 3 + 1 + 1 = 7 | 7/16 = 0.4375 |

Figure 4:
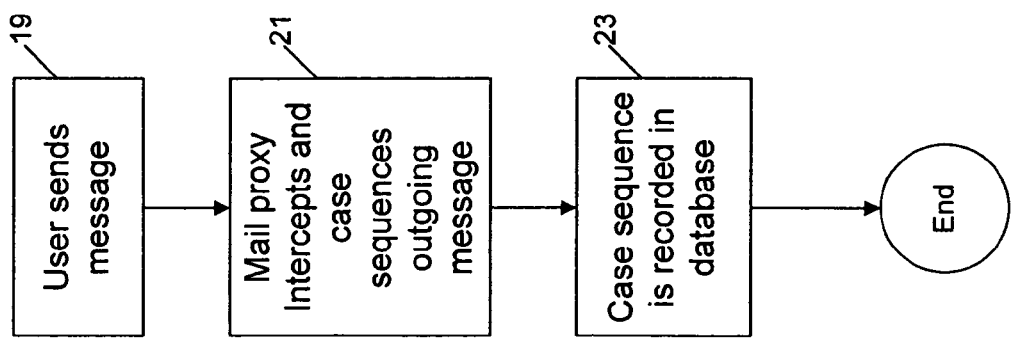
FIG. 4 is a flowchart of a method of generating an email according to the first embodiment of the invention.

Referring now to FIG. 4 there is depicted a block diagram of the steps that are carried out by SMTP relay 7 according to the presently described embodiment of the invention. Initially at box 19 a user composes and sends a message by means of application 4.

At box 21 mail proxy application 13 intercepts and case codes the sender address in the outgoing message. At box 23 the case coding is recorded in database 8.

Referring again to FIG. 1, modified message 12 is transmitted in a conventional manner via Internet 14 to USER2's workstation 16. Subsequently USER2 receives the message and reads it, typically by means of an email application similar to email application 4.

Figure 2:
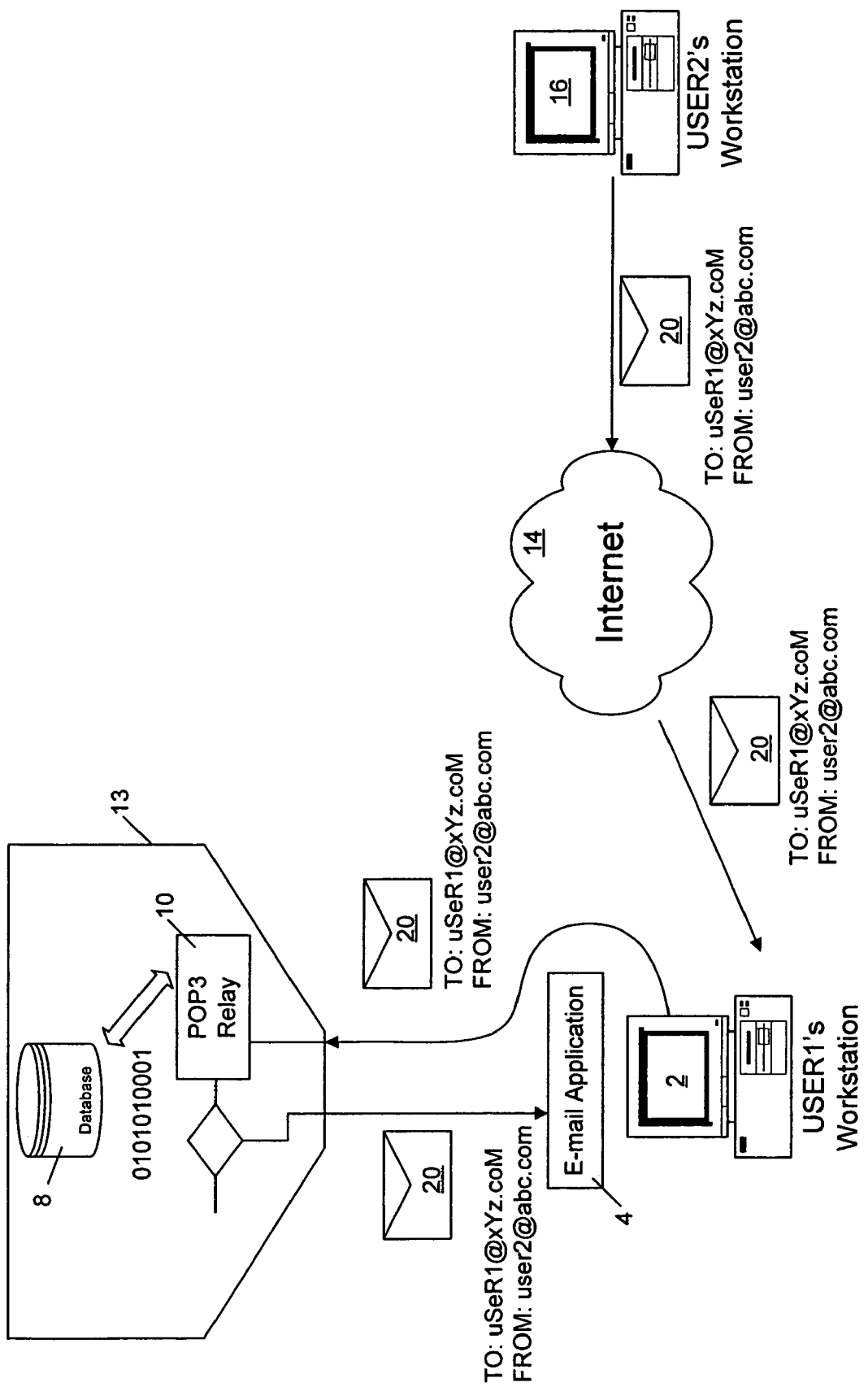
FIG. 2 is a diagram depicting the reception of a solicited email according to the first embodiment of the invention.

Referring now to FIG. 2, when USER2's email application generates a reply message 20 it uses the case-modified variation of USER1's email address throughout the message's header as indicated by its presence in the "TO" field of message 20 in FIG. 2. Reply message 20 is forwarded via case-insensitive Internet mail servers until it reaches USER1's workstation 2.

USER1's email proxy application 13 includes a POP3 Relay proxy module 10 that intercepts the reply message.

POP3 Relay proxy module 10 is programmed to perform a case insensitive parsing of the entire message header of reply message 20 for the message's intended recipient's email address. For each of the first, say ten, instances found, module 10 checks database 8 to determine if the located intended recipient address's case sequence corresponds to a predetermined criteria, namely that it matches a previously issued sender case sequence. Such a match constitutes a credential that the indicates that the message is unlikely to constitute Spam. The methodology, of checking say ten instances of the intended recipient's email address, is applied in order to circumvent the possibility of a Spammer including instances of all possible case sequences in the header in order to confuse the check performed by proxy module 10.

In the presently explained embodiment the predetermined criteria is that the address is case coded so that its case sequence corresponds to a case sequence recorded in database 8. However, other predetermined criteria are possible, for example the criteria could simply be that the address is case-coded so that there are a certain number of uppercase or lowercase symbols in the address irrespective of the sequence in which those symbols occur. In that case database 8 may be omitted.

Figure 5:
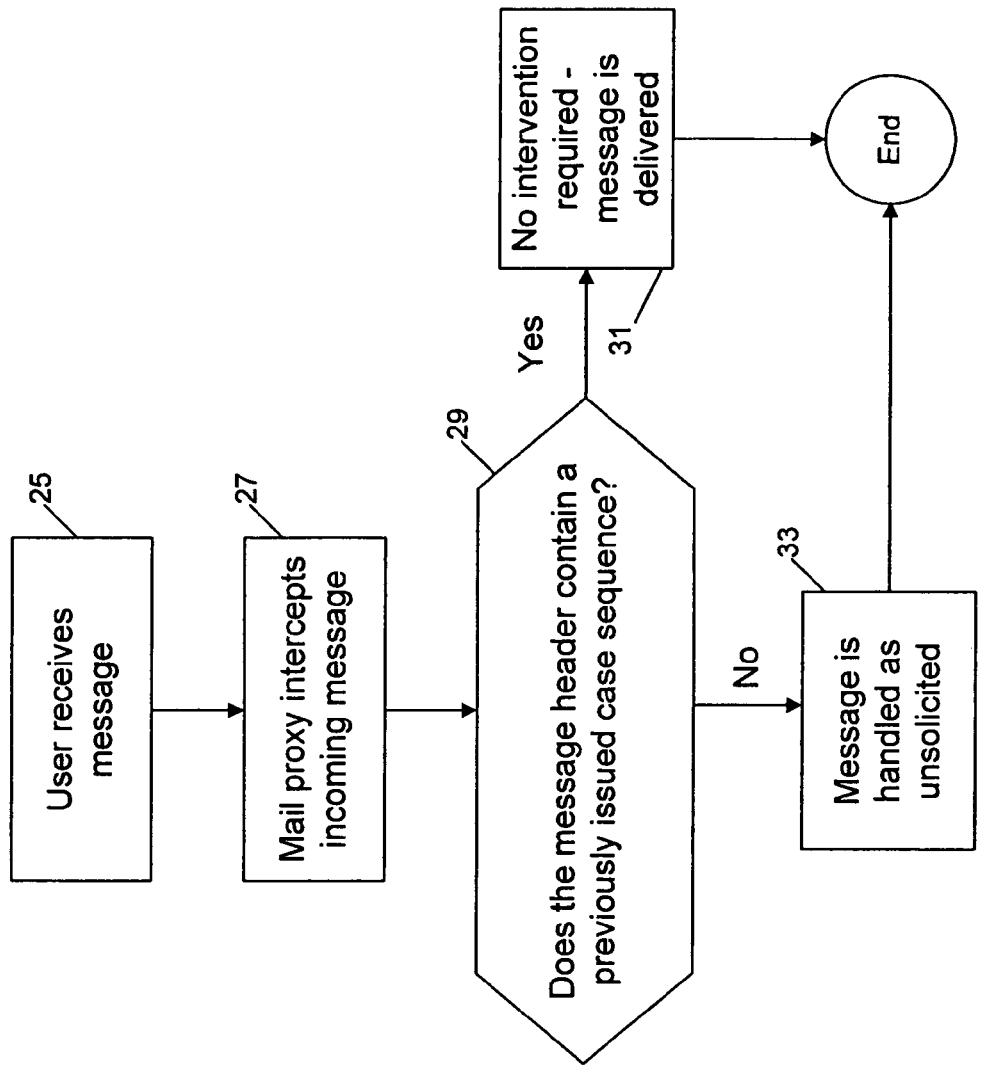
FIG. 5 is a flowchart of a method of processing a received email according to the first embodiment of the invention.

Once the checking step is successfully completed module 10 delivers the message to USER1's mail reader 4. FIG. 5 is a block diagram of the general steps carried out by POP3 relay module 10 in the presently described embodiment. At box 25 User1's workstation 2 receives message 20. At box 27 mail proxy application 13 intercepts the message. At box 29 mail proxy application 13 determines, with reference to database 8, whether or not the message header contains a previously issued case sequence. If the message header does contain a previously issued case sequence then the message is deemed not to be Spam. Control then diverts to box 31 and the message is delivered to email application 4. Alternatively, if at box 29 it turns out that the message header does not contain a previously issued case sequence, then control diverts to box 33 and the message is handled as being unsolicited and potentially Spam.

Figure 3:
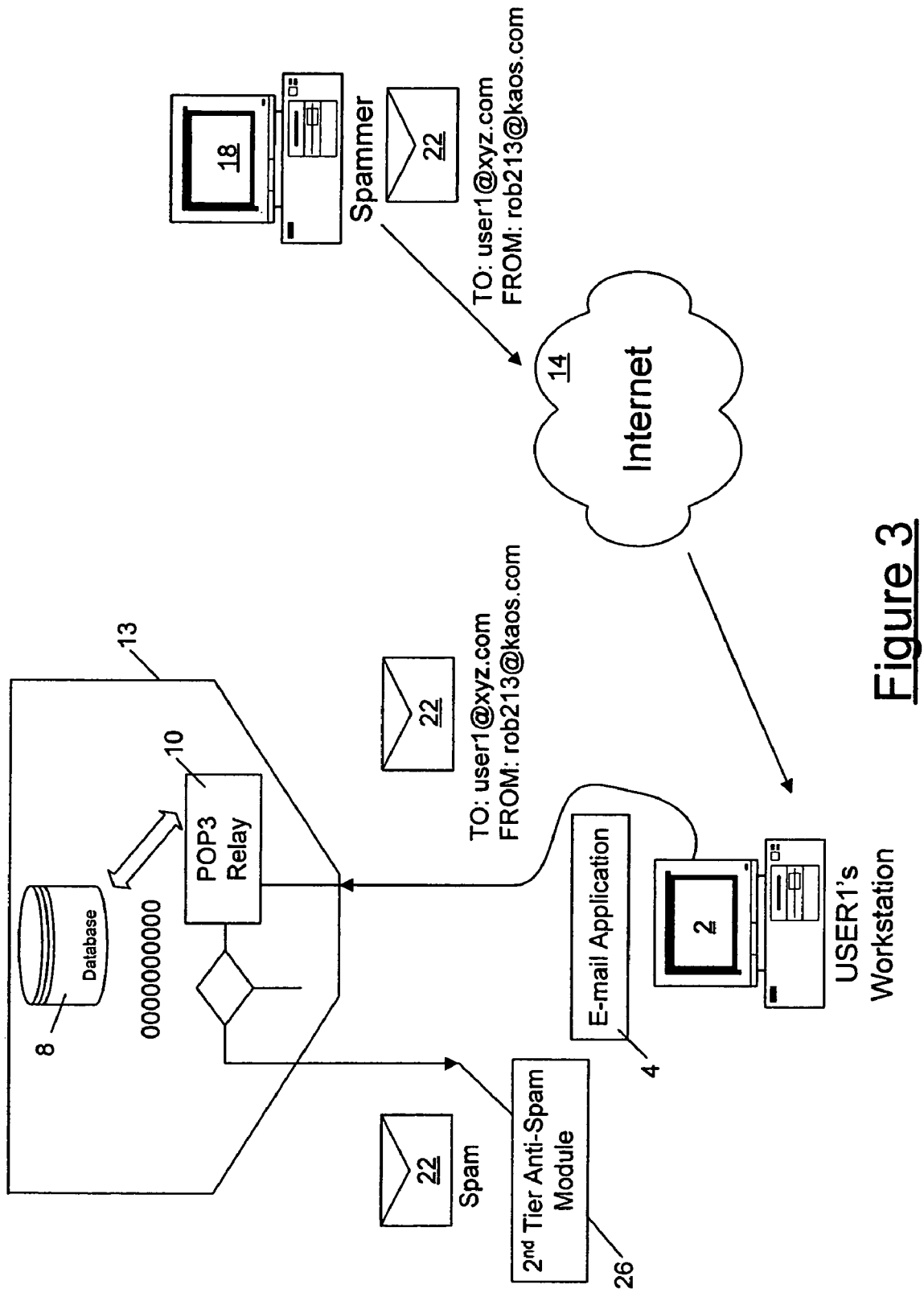
FIG. 3 is a diagram depicting the reception of a Spam email according to the first embodiment of the invention.

Referring now to FIG. 3, consider the case where a Spammer workstation 18 generates a Spam message 22 intended for USER1. Given the very large number of possible case sequences that can be used to represent USER1's email address it is highly unlikely that the email address in the "TO" field of Spam message 22 will have a case sequence stored in database 8. Consequently, upon POP3 Relay proxy module 10 intercepting Spam message 22 it determines, by inspection of database 8, that the case sequence of the message's TO field does not correspond to the case sequence of the address of a previously issued message. Accordingly, POP3 Relay module 10 treats message 22 as likely to constituting unsolicited mail. In that case message 22 is passed to a second tier anti-Spamming software module 26. Module 26 may operate to apply an anti-Spam filter or to implement the previously described challenge-response method.

Figure 6:
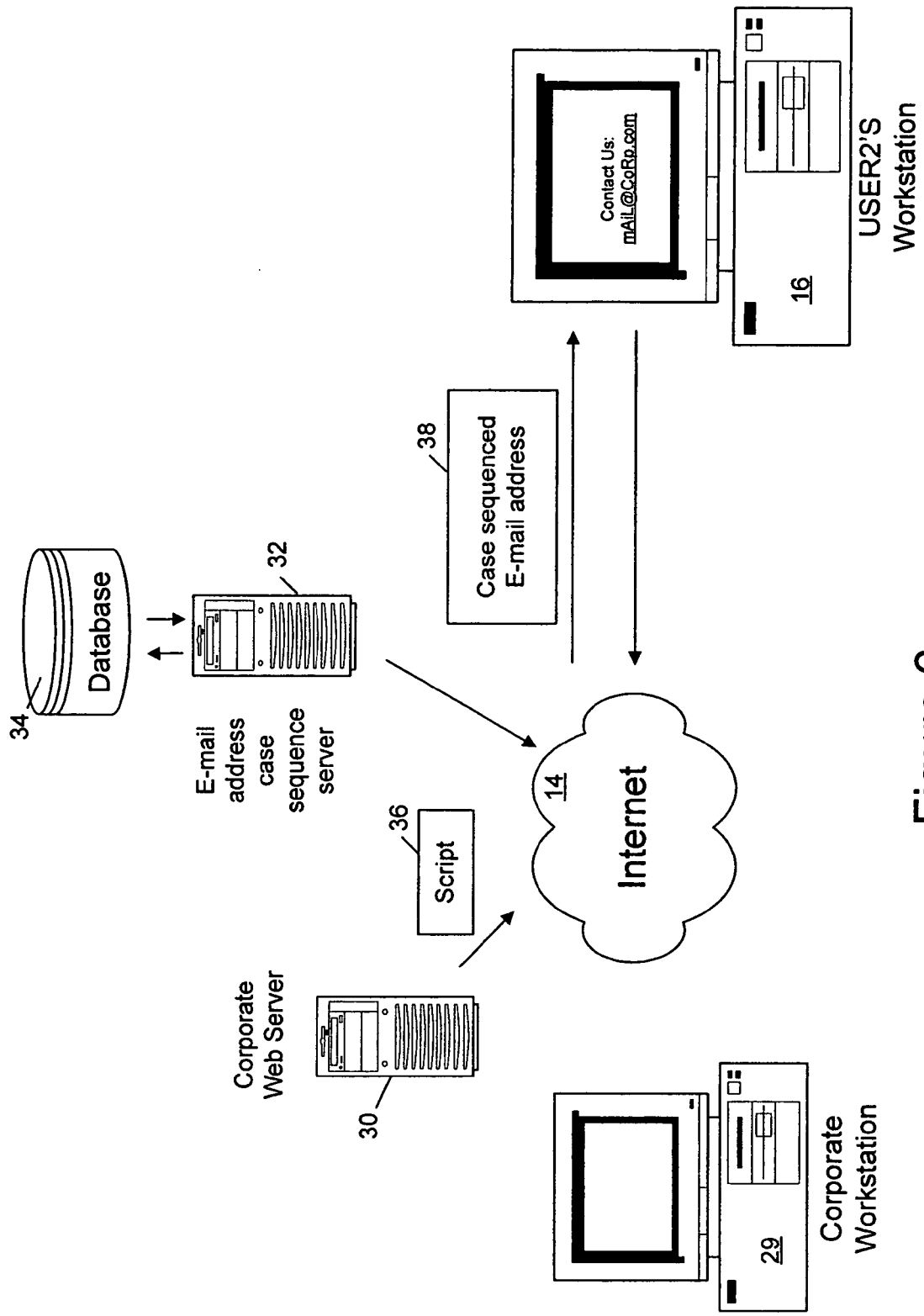
FIG. 6 is a diagram depicting the presentation of a web page including a case sequenced email address according to a further embodiment of the present invention.

A further embodiment of the invention will now be explained with reference to FIGS. 6 and 7. With reference to FIG. 6, workstation 29 is owned by a corporation which has a website that is hosted by web server 30. The corporation has an arrangement with a provider that provides an email address case sequence server 32. Server 32 maintains an email address case sequence database 34 for each of a number of clients.

Upon USER2 browsing to the corporation's website, web server 30 transmits the website's script 36, such as an HTML script, back to workstation 16. Script 36 contains a request for email address server 32 to provide a case-sequenced email address. Accordingly, address server 32 generates and provides a case-sequenced email address 38 to workstation 16 that is displayed as an email hyperlink in the workstation's browser. Address server 32 also stores the case-sequence that has been issued for the email address in question in database 34. The stored case-sequence is subsequently retired, e.g. deleted or otherwise removed for verification purposes, after a predetermined period of time which is shorter than the time it would take a Spammer to download and utilize it.

Figure 7:
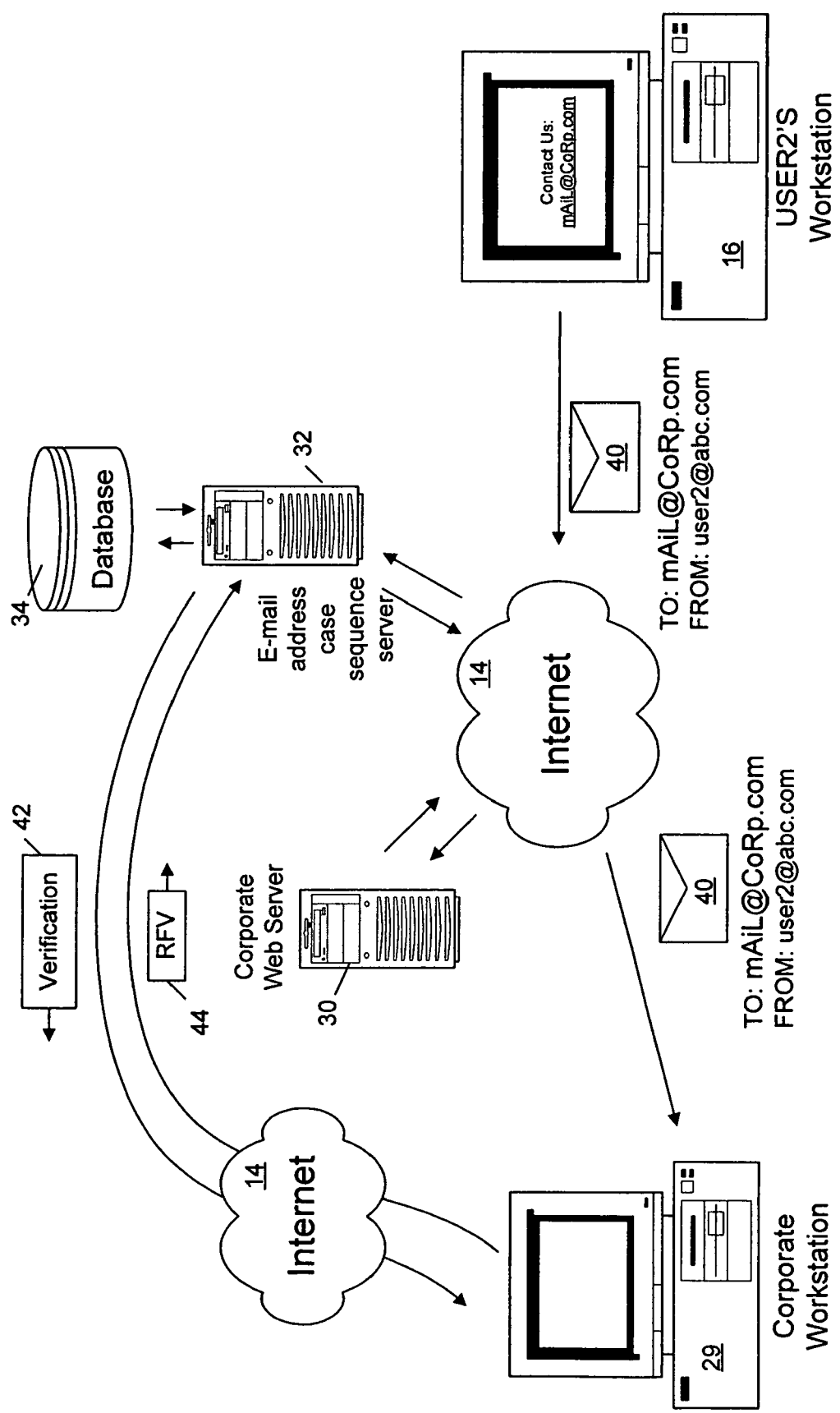
FIG. 7 is a diagram depicting the transmission and receipt of a solicited email according to the further embodiment of the invention.

Referring now to FIG. 7, in the event that the email hyperlink displayed on USER2's workstation 16 is clicked then an email message 40 will be generated that is transmitted via Internet 14 to the corporation's workstation 29.

Upon workstation 29 receiving email 40 it is programmed to send a request for verification (RFV) 44 to address server 32 asking for confirmation that the case sequence in the address of the received message can be found in database 34. Address server 32 checks database 34 and sends a verification response 42 back to Corporate workstation 29 advising whether or not the email is unsolicited. In the event that the email's case sequence does not match a case sequence stored in database 34 then server 32 deems it unsolicited. Accordingly verification response 42 notifies workstation 29 that email 40 is unsolicited. Workstation 29 may then employ a second tier Spam handling procedure, such as filtering or a challenge-response method as previously described, to process the unsolicited email.

As explained previously, email post office servers typically treat the domain portion of an email address in a case insensitive manner. However, some post office servers go further than simply operating in a case insensitive manner and actually change the domain portion of email addresses so that the symbols making up the domain portion are all upper case or all lower case. For example, post office servers of this type would retain the case coded email address, SomeMailboX@somEisp.Com as SomeMailboX@someisp.com. In order to accommodate post office servers of this type an embodiment of the present invention may only require that the mailbox identifier portion of the "TO" field email address of incoming messages has a case key that matches a previously issued message. The case code of the domain name portion of the email address is not checked. An example of the operation of the invention according to this embodiment is depicted in FIGS. 8 and 9.

Figure 8:
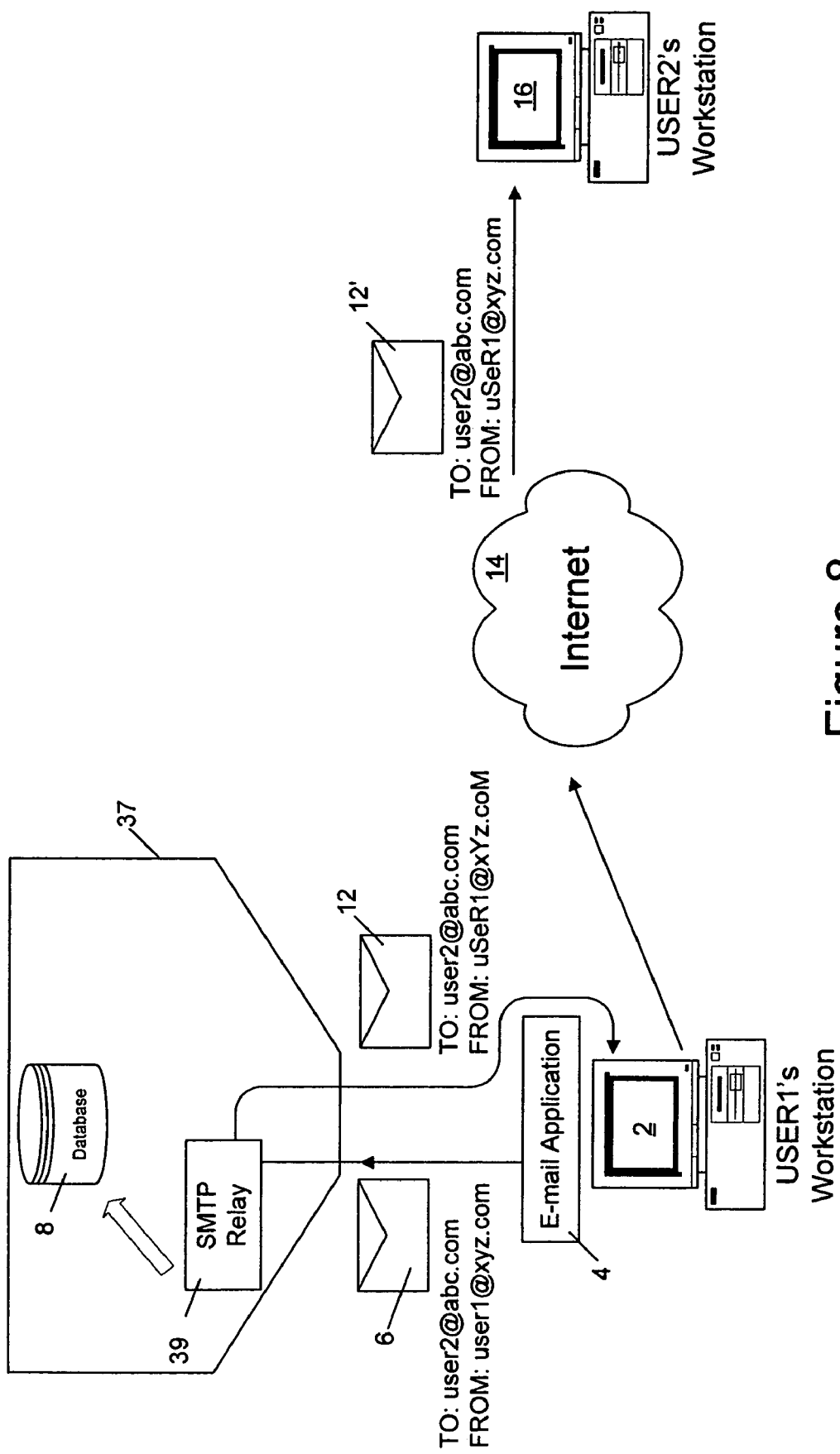
FIG. 8 is a diagram depicting the generation of an email according to a further embodiment of the invention.

Referring now to FIG. 8, USER1's workstation 2 generates an email message 6 by means of email application 4. Email message 6 includes a TO field containing the string "user2@abc.com" being the address of USER2 who operates workstation 16. After generation by application 4, email message 6 is parsed by email proxy application 37 also running on workstation 2. Proxy application 37 operates similarly to previously described application 13 of FIGS. 1 and 2 except that its SMTP Relay proxy module 39 is programmed to store both the binary number representing the case sequence of the modified email address, in this case uSeR1@xYz.coM and also the domain name of the intended recipient's email address which is "abc.com".

Modified message 12 is transmitted in a conventional manner via Internet 14 to USER2's workstation 16. However, in the present example one of the post office servers that convey the email message through Internet 14 does not pass on the case coding information in the message's domain name portion. Consequently workstation 16 receives an email that has a From field containing uSeR1@xyz.com instead of uSeR1@xYz.coM.

Figure 9:
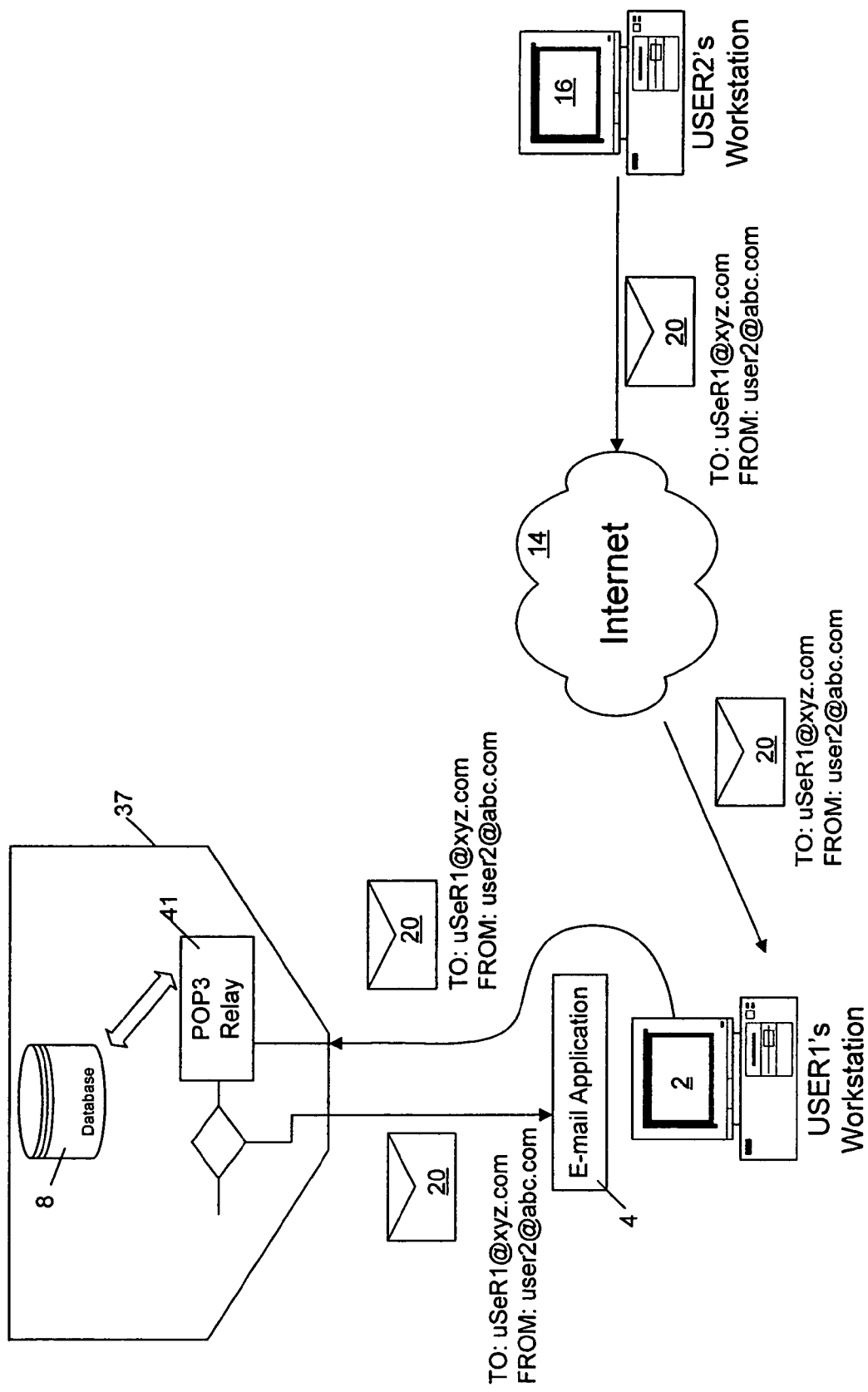
FIG. 9 is a diagram depicting the reception of a solicited email according to a further embodiment of the invention.

Referring now to FIG. 9, when USER2's email application generates a reply message 20 it uses a reply address of uSeR1@xyz.com throughout the message's header as indicated by its presence in the "TO" field of message 20 in FIG. 9. The "FROM" field of the message stores the email address user2@abc.com.

Message 20 is forwarded via post office servers within Internet 14 until it reaches USER1's workstation 2. USER1's email proxy application 37 includes a POP3 Relay proxy module 41 that intercepts the reply message. POP3 Relay proxy module 41 is programmed to check the message's intended recipient's email address and to determine if the combination of the case coding of the mailbox portion of that email address, which in the present example is uSeR1, and the domain name portion of the "FROM" field email address, which is "abc.com" matches a previously stored combination in database 8. In the present example POP3 Relay proxy module 41 finds that the combination is present in database 8 and on the basis of that match decides that the email is not Spam and so forwards it to email reader application 4.

In the above example the case coding of the mail box portion of the sender's email address was stored in database 8 in association with the domain name of the intended recipient's email address. However information other than the intended recipient's domain name could be stored in database 8 in combination with the mail box portion of the sender's email address. For example, it is common practice to store the name of the author of an email message in the email header. The name, or a significant portion of it might be used instead of the domain name.

It will be realised that many variations and further embodiments of the present embodiment, in addition to those described above, are possible. For example, the embodiments described above rely upon maintaining a database and recording the case sequences of the sender addresses that are issued. In a further embodiment of the invention only sender addresses whose binary case sequence number adds to a certain value, or accords with some other predetermined criteria, might be issued. In that case it is not necessary to maintain the database as incoming emails case coded in agreement with the predetermined criteria are automatically deemed to be solicited.

Furthermore, in the embodiment of the invention described with reference to FIGS. 6 and 7 script 36 includes instructions which cause workstation 16 to request case sequenced email address 38 directly from server 32. An alternative is for web server 30 to request a case coded email address from database 32 and insert that address into script 36 prior to sending it to workstation 16. It will also be realised that corporate web server 30 and email address server 32 may be integrated if desired.

It will be further realised that in the embodiment described with reference to FIGS. 1 to 3 emails addressed to USER1's mailbox were processed by an email proxy module 13 running on workstation 2. An alternative, which would allow USER1 to access his/her email while away from workstation 2, is to implement module 13 on the mail server that provides USER1's mailbox. Alternative methods for inserting data into electronic mail messages, which may be applied to the present application, are described in U.S. Patent Application No. 60/426,069 filed Nov. 11, 2002 by the present inventor and which is hereby incorporated in its entirety by cross-reference.

The embodiments of the invention described herein are provided for purposes of explaining the principles thereof, and are not to be considered as limiting or restricting the invention since many modifications may be made by the exercise of skill in the art without departing from the scope of the following claims.

I claim:

1. A computer-implemented method for filtering email messages having an intended recipient email address identifying a user's mailbox, the method including, the steps of:
   receiving an email message on a computer sent to or from an electronic mail application;
   identifying a pattern of uppercase and lowercase letters used to form the intended recipient email address;
   generating an email message validation pattern based on the identified pattern;
   comparing the email message validation pattern to a stored email message validation pattern;
   providing filtering instruction to the electronic mail application for the email message based on the comparison;
   wherein the received email message comprises a reply to a prior email message sent from a sender's email address that is the intended recipient email address of the received email message, the method further including the additional steps of (a) applying case alterations to letters used to form the sender's email address of the prior email message producing a pattern of uppercase and lowercase letters used to form the sender's email address, (b) generating the email message validation pattern based on the pattern of uppercase and lowercase letters symbols used to form the sender's email address, and (c) storing the email message validation pattern for subsequent reference during said comparing step; and
   wherein the sender's email address comprises a local portion and a domain portion and wherein the email message validation pattern stored in step (c) comprises the pattern of uppercase and lowercase letters used to form the local portion of the sender's email address produced during step (a).

2. A computer-implemented method according to claim 1, wherein the step of comparing the email message validation pattern to a stored validation pattern includes determining if a case sequence of at least a portion of the intended recipient email address corresponds to a previously stored case sequence.

3. A computer-implemented method according to claim 1, wherein the step of comparing the email message validation pattern to a stored validation pattern further includes determining if a domain name portion of a sender email address of each of the email messages corresponds to a previously stored domain name.

4. A computer-implemented method according to claim 3, including determining if the domain name portion of the sender email address is a case insensitive match with a previously stored domain name.

5. A computer-implemented method according to claim 1, wherein a plurality of patterns of uppercase and lowercase letters used to form the sender's email address are produced in step (a) and further comprising the additional steps of (i) performing a readability analysis on each one of the plurality of patterns, and (ii) selecting one of the plurality of patterns that is most readable for use in step (b).

6. A computer-implemented method according to claim 1, wherein the email message validation pattern stored in step (c) comprises a copy of the sender's email address after applying the case alterations.

7. A computer-implemented method according to claim 1, wherein the email message validation pattern stored in step (c) comprises a binary number.

8. A computer-implemented method according to claim 1 wherein the sender's email address comprises a local portion and a domain portion and wherein the email message validation pattern stored in step (c) comprises the letters used to form the domain portion of the sender's email address produced during step (a).

9. A computer-implemented method according to claim 1 further including the step of deleting the email message validation pattern stored in step (c) after a predetermined time.

10. A computer-implemented method according to claim 1 wherein the step of applying case alterations to letters comprising a the sender's email address produces a pattern of uppercase and lowercase letters used to form the sender's email address which is in turn used to form an email hyperlink for inclusion in web pages.

11. A computer-implemented method according to claim 1, wherein the step of comparing the email message validation pattern to a stored validation pattern is performed by software running on the computer on which the electronic mail application which is used to read mail from the user's mailbox resides.

12. A computer-implemented method according to claim 1, wherein the step of comparing the email message validation pattern to a stored validation pattern is performed by software running on an Internet email server in communication with a computer used to read mail from the user's mailbox.

13. A computer configured to execute instructions embodied in a non-transitory computer readable medium of the computer, the instructions being executable by the computer to perform a series of steps, including
   receiving an email message sent to or from an electronic mail application;
   identifying a pattern of uppercase and lowercase letters used to form an intended recipient email address;
   generating an email message validation pattern based on the identified pattern;
   comparing the email message validation pattern to a stored validation pattern;
   providing filtering instruction for the email message based on the comparison;
   applying a computer-implemented anti-Spam filter to the email message;
   wherein the received email message comprises a reply to a prior email message sent from a sender's email address that is the intended recipient email address of the received email message, the method further including the additional steps of (a) applying case alterations to letters used to form the sender's email address of the prior email message producing a pattern of uppercase and lowercase letters used to form the sender's email address, (b) generating the email message validation pattern based on the pattern of uppercase and lowercase letters symbols used to form the sender's email address, and (c) storing the email message validation pattern for subsequent reference during said comparing step; and
   wherein the sender's email address comprises a local portion and a domain portion and wherein the email message validation pattern stored in step (c) comprises the pattern of uppercase and lowercase letters used to form the local portion of the sender's email address produced during step (a).

14. A computer according to claim 13, further including instructions to determine if a case sequence of at least a portion of the intended recipient email address corresponds to a previously stored case sequence.

15. A computer according to claim 13, including instructions to determine if a domain name portion of a sender email address of the email message corresponds to a previously stored domain name.

16. A computer according to claim 15, wherein the instructions to determine if a domain name portion of the sender's email address corresponds to a previously stored domain name includes instructions to determine if a domain name portion of the sender's email address is a case insensitive match with a previously stored domain name.

17. A computer according to claim 13, wherein a plurality of patterns of uppercase and lowercase letters used to form the sender's email address are produced in step (a) and further comprising instructions to (i) perform a readability analysis on each one of the plurality of patterns, and (ii) select one of the plurality of patterns that is most readable for use in step (b).

18. A computer according to claim 13, including instructions to store the email message validation pattern stored in step (c) in the form of a binary number.

19. A computer according to claim 13, wherein the sender's email address comprises a local portion and a domain portion and wherein the email message validation pattern stored in step (c) comprises the letters used to form the domain portion of the sender's email address produced during step (a).

20. A computer according to claim 13 including instructions to delete the email message validation pattern stored in step (c) after a predetermined time.

21. A computer-implemented method for filtering email messages having an intended recipient address identifying a user's mailbox, the method including, for each of said messages, the steps of:
   receiving an outgoing email message at a first computer;
   applying case alterations to letters used to form the intended recipient email address of the outgoing email message producing a pattern of uppercase and lowercase letters used to form the recipient email address and generating an email message validation pattern based on the pattern of uppercase and lowercase letters used to form the recipient email address;
   wherein the recipient email address comprises a local portion and a domain portion and wherein the email message validation pattern comprises a pattern of uppercase and lowercase letters used to form the local portion of the recipient email address;
   storing the email message validation pattern in association with the intended recipient email address on the first computer for subsequent reference;
   receiving a reply incoming email message from a sender's email address that is the intended recipient email address;
   comparing the stored email message validation pattern to an email message validation pattern generated based on a pattern of uppercase and lowercase letters used to form the sender's email address in the reply incoming email message; and
   providing filtering instruction for the email message based on the comparison.

22. A computer-implemented method according to claim 21 wherein the validation pattern comprises a code based upon a case sequence of a sender's email address.

23. A computer-implemented method according to claim 22 wherein the code comprises a binary number.

24. A computer-implemented method according to claim 21 wherein the validation pattern is retained by a second computer that is remotely located.

25. A computer-implemented method according to claim 24 wherein the validation pattern is generated or otherwise provided by the second computer that is remotely located.

26. A computer-implemented method according to claim 21 wherein the validation pattern is used by a third computer that is remotely located to ascertain whether a future email is unsolicited.

27. A computer-implemented method according to claim 26 wherein the future email is blocked if it is determined to be unsolicited.

28. A computer-implemented method according to claim 26 wherein the future email is further processed to determine whether it is Spam if the future email is determined to be unsolicited.

29. A computer-implemented method according to claim 21 wherein the validation pattern comprises a case sequence that is retained in a database along with a date of creation of the case sequence and an expiration date of the case sequence.

30. A computer-implemented method according to claim 29 wherein details of an addressee associated with the intended recipient email address are also stored in the database with each corresponding case sequence.

* * * * *